Jan. 14, 1930.  P. W. DALRYMPLE  1,743,324
CONVEYER
Filed March 19, 1927   4 Sheets-Sheet 2
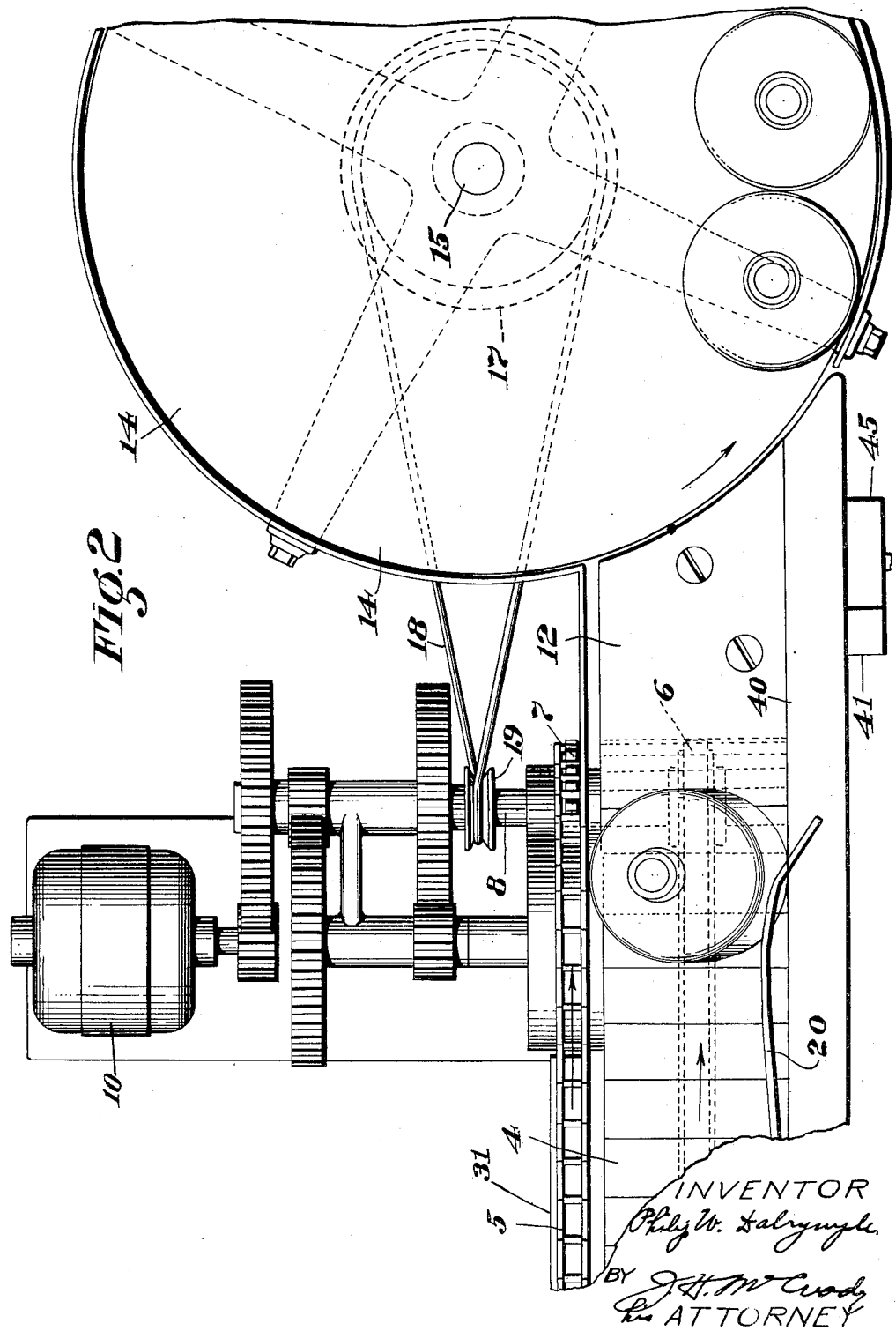

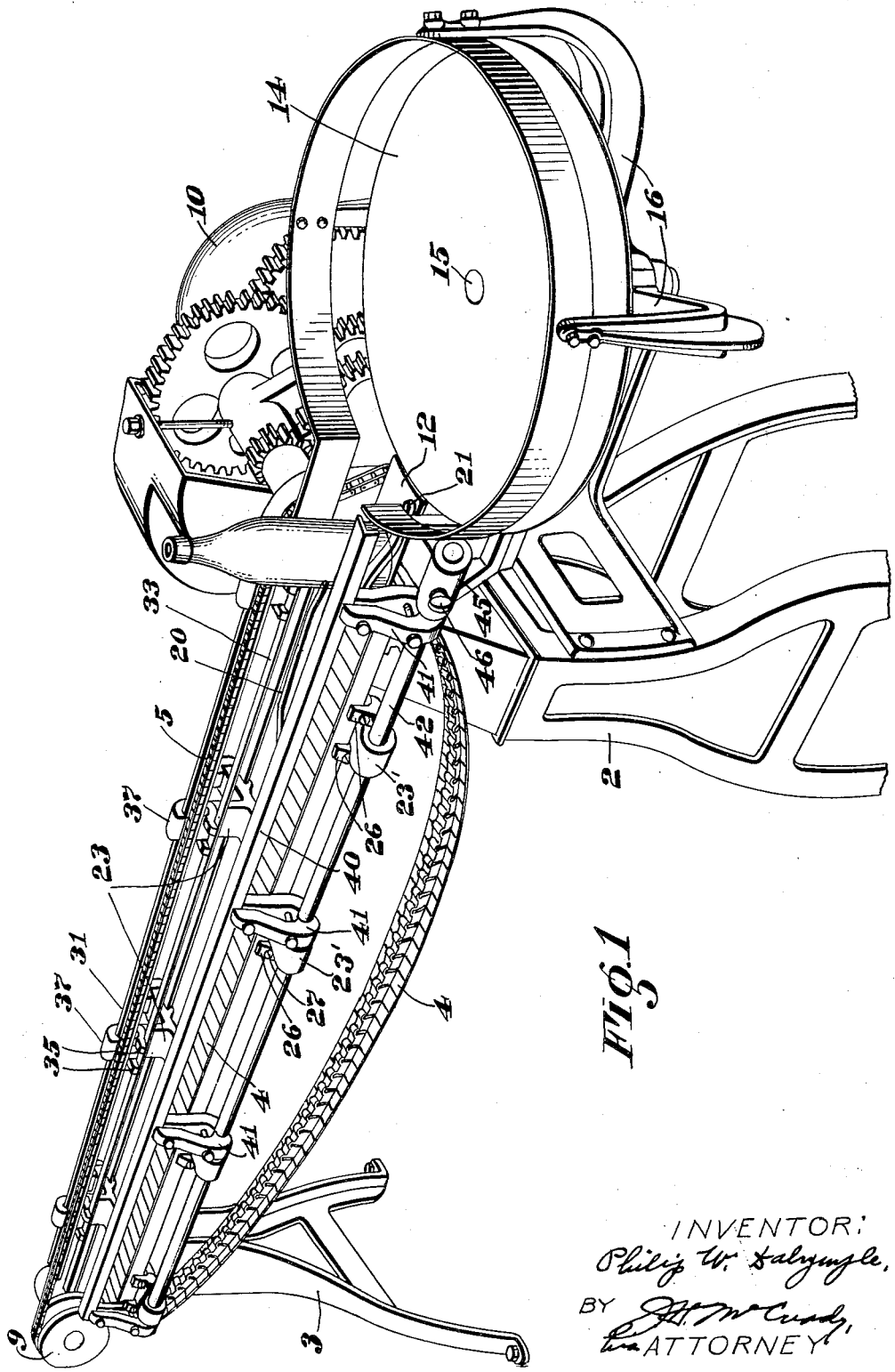

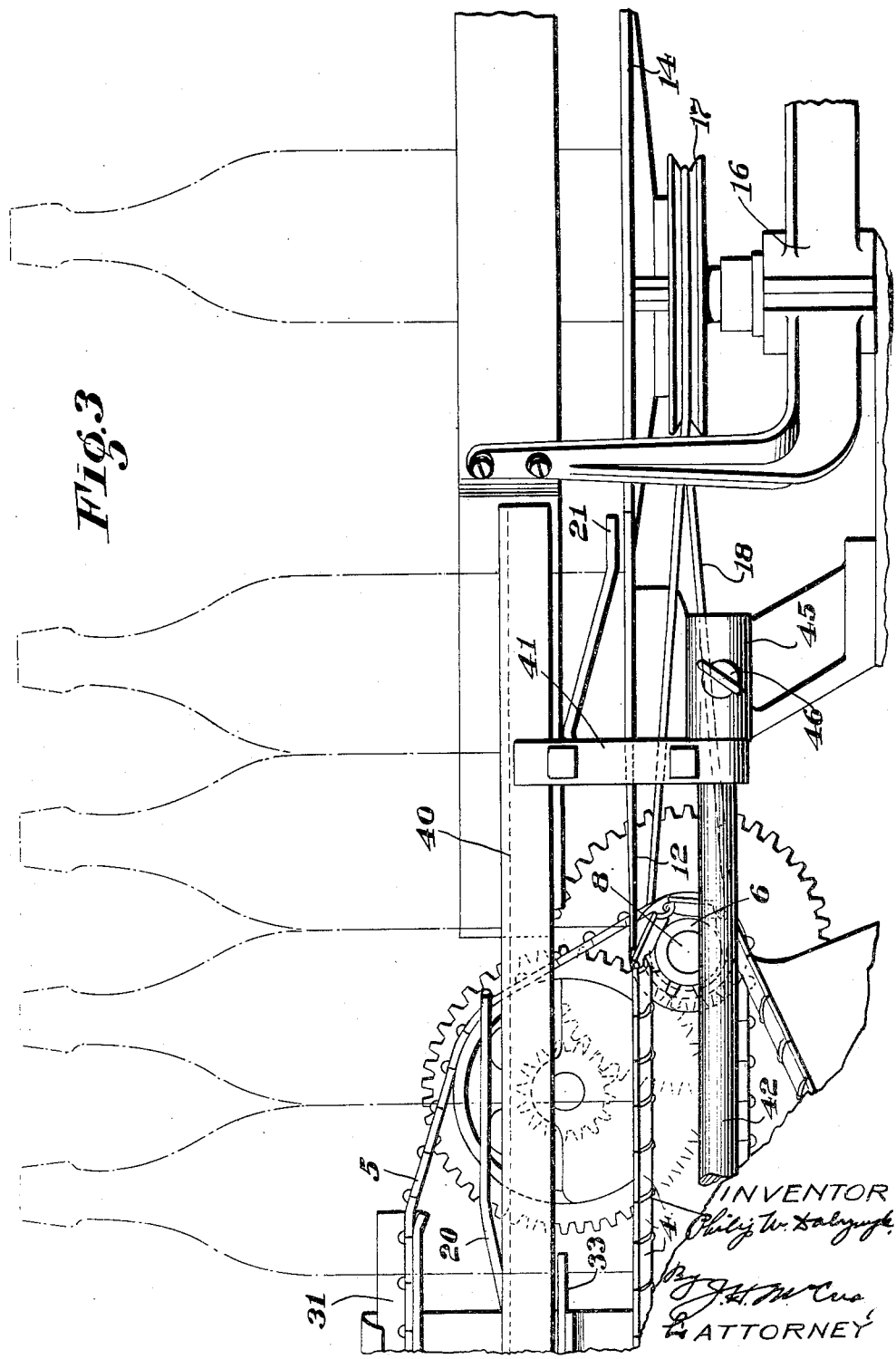

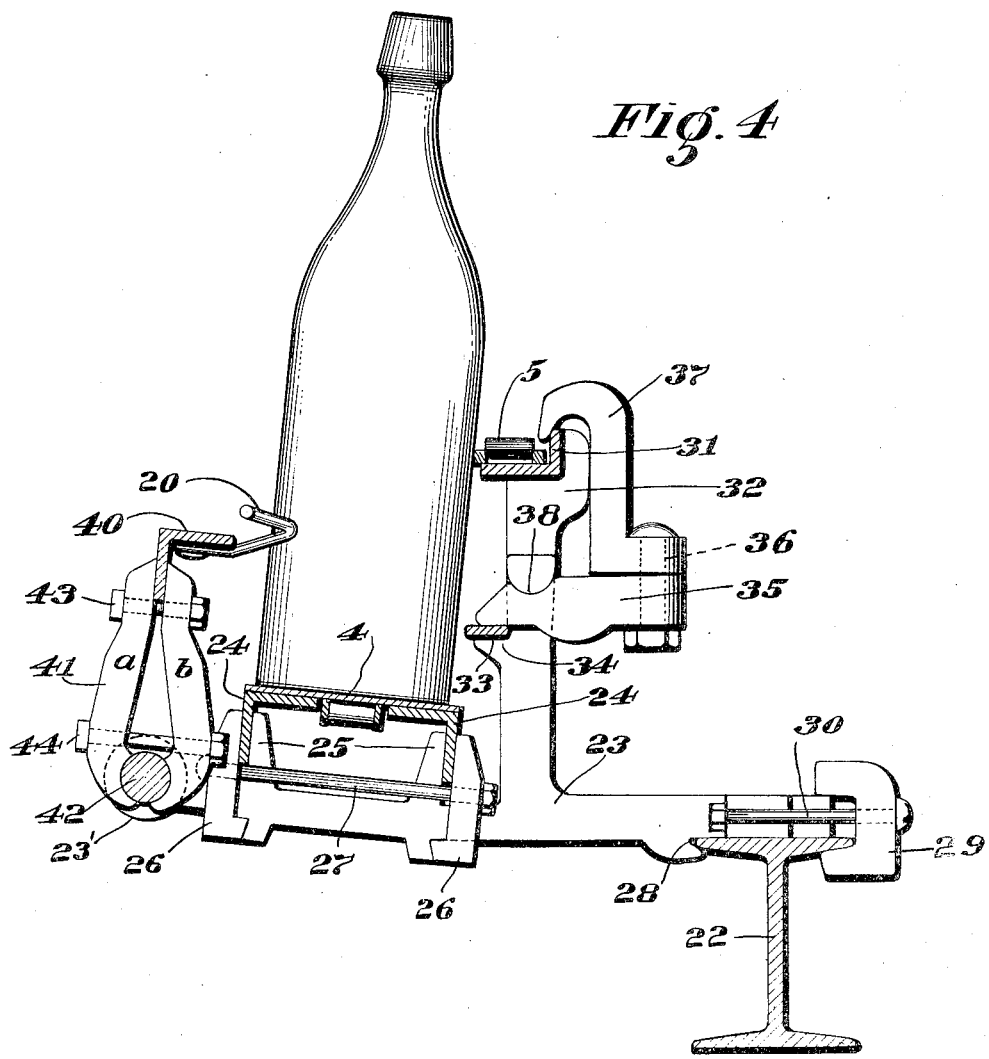

Patented Jan. 14, 1930

1,743,324

UNITED STATES PATENT OFFICE

PHILIP W. DALRYMPLE, OF NEWTON, MASSACHUSETTS, ASSIGNOR TO INDUSTRIAL MACHINES COMPANY, OF BOSTON, MASSACHUSETTS, A CORPORATION OF MASSACHUSETTS

CONVEYER

Application filed March 19, 1927. Serial No. 176,637.

This invention relates to conveyers and is especially concerned with conveyers of the belt type adapted to handle bottles and similar articles.

In conveying bottles in the usual belt conveyer much trouble is caused by the fact that a single bottle frequently will tip over and knock down all, or a considerable part of, the line of bottles on the belt. The present invention aims to devise a construction in which this difficulty will be substantially eliminated.

It is also an important object of the invention to reduce the manufacturing expense of conveyers and to devise a construction which will be readily adaptable for manufacture in different sizes while still keeping within reasonable cost requirements.

The nature of the invention will be readily understood from the following description when read in connection with the accompanying drawings, and the novel features will be particularly pointed out in the appended claims.

In the drawings,

Figure 1 is a perspective view of a conveyer constructed in accordance with this invention;

Fig. 2 is a plan view of a portion of the conveyer shown in Fig. 1;

Fig. 3 is a side elevation of part of the conveying mechanism shown in Fig. 1; and Fig. 4 is a transverse, cross-sectional view through the conveyer belts and the supporting mechanism for them.

The conveying mechanism shown in the drawings comprises two standards 2 and 3, respectively, which support the opposite ends of the conveyer proper, the standard 2 also supporting the driving mechanism. The machine includes two conveyer belts 4 and 5, the term "belt" being used in a generic sense to include chains and segmental belts, as well as continuous belts. As shown, the belt 4 is of the segmental or sectional type, while the belt 5 is of the chain type, both of these types, however, being well known in this art.

A unique feature of this conveyer resides in the fact that the belts 4 and 5 cooperate to support the bottles or other articles being conveyed in positions which are laterally inclined with reference to the direction of travel of the bottles. For this purpose the main belt 4 on which the bottoms of the bottles rest is laterally inclined, as best shown in Fig. 4, and the belt 5 engages the sides of the bottles and steadies them while they are being conveyed by the main belt. I have found that this arrangement greatly increases the stability of the bottles while they are being conveyed and substantially eliminates interruptions due to the tipping over of the bottles.

The standard 2 carries a driving pulley or sprocket 6, Figs. 2 and 3, for the main belt 4, and another sprocket 7 for the belt 5, both of these sprockets being mounted on the driving shaft 8. Additional sprockets or pulleys for supporting the farther ends of the belts are carried by the standard 3, the pulley for the belt 5 being shown at 9 in Fig. 1. The machine may be driven from any convenient source of power. Usually a small electric motor 10, Fig. 2, is used for this purpose, this motor operating through a reduction gearing, which is clearly shown in Fig. 2, to drive the shaft 8 at a relatively slow speed.

According to the usual arrangement, the bottles are placed on the outer or left-hand end of the conveyer, Fig. 1, and are carried toward the right-hand end, the bottles remaining in their laterally inclined positions, as above stated. When they reach the discharge end of the conveyer they slide on to a short plate 12, the upper surface of which is substantially flush with the bottle supporting surface of the conveyer belt 4, and each bottle as it is moved on to this plate pushes forward the bottle which precedes it. This results in delivering the bottles one at a time to a rotary table 14 mounted on the upper end of a vertical shaft 15 which is supported in bearings carried by the bracket 16. A pulley 17, Figs. 2 and 3, is secured on the shaft 15 and is connected by a belt 18 to a pulley 19, Fig. 2, fast on the main shaft 8. This mechanism, therefore, rotates the table 14 slowly in the direction indicated by the arrow in Fig. 2.

Just before the bottles leave the main conveyer 4 they come in contact with a wire spring 20 which serves to steady the bottles as they leave the conveyer and move on to the plate 12. A guard 21, Figs. 1 and 3, engages the lower part of each bottle as it leaves the plate 12 and is picked up by the rotating table 14 and assists in steadying the bottle during this movement. It may here be noted that the plate 12 is warped so that while the bottles are inclined when they slide on to it, they are straightened up before they leave it.

Conveyers necessarily vary in length, according to the conditions obtaining in the plants where they are to be used, and an important feature of this invention resides in certain details of construction of the conveyer which facilitates its manufacture in different sizes. The two standards 2 and 3 are connected by an I-beam 22, Fig. 4, and this I-beam carries a series of brackets 23, Figs. 1 and 4, which support the various guides that cooperate with the conveyer belts or with the articles which they carry. It will be seen from an inspection of Fig. 4 that the upper reach of the main conveyer 4 is supported on and guided by two lengths of angle iron 24—24. These angle iron pieces are supported at intervals by the brackets 23, each bracket having two lugs 25—25 to engage the inner faces of the upright flanges of the parts 24—24. Cooperating with these lugs are two U-shaped clamping members 26—26 which engage the outer surfaces of said flanges, and two bolts 27 extend through the legs of both clamping members and draw them securely into their clamping relationship to the lugs 25—25.

In order to secure the brackets 23 to the I-beam 22, each bracket is provided with a notch 28, Fig. 4, to receive the edge of the upper flange of the beam, a portion of the bracket resting on this flange. A clamping member 29 fits under the opposite edge of the web of the I-beam and over the upper edge of the bracket, while a bolt 30 fitting into a groove in one side of the bracket draws the bracket and the clamping member 29 securely against opposite edges of the flange.

The side belt 5 is guided in an angle iron member 31, Figs. 1, 3 and 4, which is supported in angular seats formed in the upper ends of upright extensions 32 of the bracket 23. Another guide consisting simply of a flat bar or rod 33, Figs. 1 and 4, is supported in seats 34 which also are formed in the upright portions 32 of the brackets. Bearing on this bar 33 is a clamping member 35 which is secured by a bolt 36 to a hook-shaped clamping member 37 that fastens the angle iron member 32 in its seat. As the nut on the bolt 36 is tightened up, the lower clamping member 35 rocks on the lower rounded surface of a lug 38, Fig. 4, projecting laterally from the part 32, thus acting as a lever to clamp the guide bar 33 on the seat 34, while at the same time the hook-shaped clamping member 37 is drawn downwardly and clamps the angular guide 31 in its seat. The bar 33 serves to guide any bottles which are thrown on the belt in a horizontal position.

In addition to the guides above mentioned, another guide 40 which also consists of a length of angle iron, or any equivalent material, is provided at the outer side of the path of travel of the bottles. This guide is supported at intervals in a series of clamps 41, Figs. 1 and 4, which are mounted on a long rod 42 lying immediately beside the conveyer belt 4. Each of these clamps, as clearly shown in Fig. 4, comprises two like clamping members $a$ and $b$ secured together by upper and lower bolts 43 and 44, the upper bolt causing the clamp to grip the upright flange of the angle iron 40, while the lower bolt clamps the parts $a$ and $b$ securely on the rod 42. This rod is mounted in extensions 23' of the bracket 23 and also in a bearing 45, Figs. 1 and 3, which is secured to the standard 2. Such a mounting of the rod 42 permits the guide 40 and the brackets 41 which support it, to be adjusted in unison about the axis of the rod toward or from the path of travel of the bottles, so that the guide or rail can readily be set in the proper location to cooperate with bottles of different diameters. The rod 42 is secured in its adjusted position by a clamping screw 46, Figs. 1 and 3. When the conveyer is made very long it may be necessary to use one or more additional clamping screws in other bearing members for this rod.

It will be observed that in order to make a longer or shorter conveyer, it is simply necessary to cut the guide members 24, 31, 33 and 40 and the rod 42 to the proper length, and to provide the necessary number of brackets 23 to support them, the I-beam 22 also being cut to a suitable length. The brackets and clamping members require no machining so that the labor expense is materially reduced. This affords, therefore, a very flexible design, readily adapted to a great variety of conditions, and in which manufacturing costs are kept within very reasonable limits. At the same time a conveyer is provided which is sturdy and substantial in construction.

While I have herein shown and described a preferred embodiment of my invention, it will be understood that the invention is not limited to embodiment in the particular form shown.

Having thus described my invention, what I desire to claim as new is:

1. In a bottle conveyer, the combination of a conveyer belt adapted to support a series of bottles by engagement with the bottoms of the bottles, a second belt arranged to engage the sides of the bottles supported on the first belt, said belts cooperating to convey the bottles in a position laterally inclined with reference to their direction of travel, and supporting and driving means for said belts.

2. In a bottle conveyer, the combination of a conveyer belt adapted to support a series of bottles by engagement with the bottoms of the bottles, a second belt arranged to engage the sides of the bottles supported on the first belt, said belts cooperating to convey the bottles in a position laterally inclined with reference to their direction of travel, a plate at the discharge end of said first belt and on to which the bottles are discharged by said belts, and supporting and driving means for said belts.

3. In a bottle conveyer, the combination of a conveyer belt adapted to support a series of bottles by engagement with the bottoms of the bottles, a second belt arranged to engage the sides of the bottles supported on the first belt, said belts cooperating to convey the bottles in a position laterally inclined with reference to their direction of travel, a short plate on to which the bottles are delivered by said belts and across which they are forced by succeeding bottles, and a revolving table substantially flush with said plate and arranged to receive the bottles from said plate.

4. In a bottle conveyer, the combination of a conveyer belt adapted to support a series of bottles by engagement with the bottoms of the bottles, a second belt arranged to engage the sides of the bottles supported on the first belt, said belts cooperating to convey the bottles in a position laterally inclined with reference to their direction of travel, a plate at the discharge end of said first belt and to which the bottles are discharged by said belts, supporting and driving means for said belts, and means additional to said belts for engaging and steadying said bottles as they are discharged by said first belt.

5. In a conveyer, the combination of a conveyer belt, and a track for said belt comprising two parallel lengths of angle iron, a plurality of brackets supporting said angle irons at spaced intervals, two clamping members cooperating with each bracket to grip the webs of both angle irons, and adjustable means for securing said members in their gripping positions.

6. In a conveyer, the combination of a conveyer belt, and a track for said belt comprising two parallel lengths of angle iron, a plurality of brackets supporting said angle irons at spaced intervals, two clamping members cooperating with each bracket to grip the webs of both angle irons, and a single bolt acting on said members to hold them in gripping position.

7. In a bottle conveyer, the combination of a conveyer belt having a substantially horizontal reach adapted to support a series of bottles standing on their ends, the surface of said belt on which the bottles are supported being laterally inclined, supporting and driving means for said belt, and means additional to said belt for engaging the sides of the bottles to steady them while they are conveyed by said belt.

8. In a conveyer, the combination of a conveyer belt, a guide extending longitudinally beside the path of travel of the articles conveyed by said belt, a plurality of clamps supporting said guide, a rod on which said clamps are secured, said rod extending substantially parallel to the conveyer, and means for supporting said rod for rocking adjustment to move said clamps and guide in unison toward or from the path of travel of the conveyed articles.

9. In a conveyer, the combination of two guides extending substantially parallel to the path of travel of the conveyed articles and adjacent thereto, a plurality of brackets supporting said guides at spaced intervals, each bracket having a seat for both of said guides, two clamping members cooperating with each bracket for securing the guides in their seats, and a single bolt acting on both of said clamping members to draw them firmly into their guide clamping positions.

10. In a conveyer, the combination of a conveyer belt, guides cooperating with said belt and extending parallel thereto, a plurality of brackets for supporting said guides at spaced intervals, an I-beam to which said brackets are secured, each bracket having a notch to receive one edge of a flange of the I-beam, a clamping member adapted to fit over the opposite edge of said flange, and a bolt cooperating with said bracket and said member to draw them securely against opposite edges of said flange.

11. In a bottle conveyer, the combination of a conveyer belt adapted to support a series of bottles by engagement with the bottoms of the bottles, a second belt arranged to engage the sides of the bottles supported on the first belt, said belts cooperating to convey the bottles in a position laterally inclined with reference to their direction of travel, and a plate on to which the bottles are delivered by said belts, said plate having an inclined portion to receive the bottles and an approximately horizontal portion across which they are forced by succeeding bottles, whereby the bottles are brought into approximately an upright position as they are moved across the latter portion of the plate.

PHILIP W. DALRYMPLE.